(12) United States Patent
Machida et al.

(10) Patent No.: US 9,845,420 B2
(45) Date of Patent: Dec. 19, 2017

(54) LATENT HEAT COLD STORAGE MATERIAL

(71) Applicant: Panasonic Intellectual Property Management Co., Ltd., Osaka (JP)

(72) Inventors: Hironobu Machida, Nara (JP); Motohiro Suzuki, Osaka (JP); Shinsuke Takeguchi, Osaka (JP); Kentaro Shii, Osaka (JP); Kazuaki Suito, Saitama (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 15/264,907

(22) Filed: Sep. 14, 2016

(65) Prior Publication Data
US 2017/0107414 A1  Apr. 20, 2017

(30) Foreign Application Priority Data
Oct. 19, 2015  (JP) .................................. 2015-205829

(51) Int. Cl.
*C09K 5/00* (2006.01)
*C09K 5/06* (2006.01)

(52) U.S. Cl.
CPC .............. *C09K 5/066* (2013.01); *C09K 5/063* (2013.01)

(58) Field of Classification Search
CPC ............. C09K 5/00; C09K 5/06; C09K 5/063
USPC .......................................................... 252/71
See application file for complete search history.

(56) References Cited

U.S. PATENT DOCUMENTS

| | | | | |
|---|---|---|---|---|
| 1,785,730 A | * | 12/1930 | Davis | C07C 273/1863 564/61 |
| 2,280,996 A | * | 4/1942 | Booth | C09K 8/18 507/131 |
| 2,521,311 A | * | 9/1950 | Schwoegler | C23F 11/08 106/14.15 |
| 2,979,463 A | * | 4/1961 | Ferguson | C09K 5/066 252/70 |
| 3,950,158 A | * | 4/1976 | Gossett | F24J 1/00 206/219 |
| 3,957,472 A | * | 5/1976 | Donnelly | F25D 5/02 62/4 |

(Continued)

FOREIGN PATENT DOCUMENTS

EP   1113065 A1 * 7/2001 .............. C09K 5/06
JP   11-035933    2/1999
(Continued)

OTHER PUBLICATIONS

Machine translation of JP 2000-256659 A to Kakiuchi et al. published Sep. 2000.*

*Primary Examiner* — Jane L Stanley
(74) *Attorney, Agent, or Firm* — McDermott Will & Emery LLP

(57) ABSTRACT

Provided is a latent heat cold storage material containing: water; a crystalline powder; and at least one inorganic salt. The crystalline powder is formed of a compound having a saturated concentration of less than 7.0 wt % to an aqueous solution of the inorganic salt having a concentration of 25 wt % at 25° C. A concentration of the crystalline powder exceeds a saturated concentration of the crystalline powder to the aqueous solution of the inorganic salt at 25° C.

15 Claims, 2 Drawing Sheets

(56) References Cited

U.S. PATENT DOCUMENTS

| | | | | |
|---|---|---|---|---|
| 4,081,256 A | * | 3/1978 | Donnelly | C09K 5/066 |
| | | | | 252/70 |
| 5,402,650 A | * | 4/1995 | Stewart, Jr. | C09K 5/063 |
| | | | | 62/347 |
| 2003/0195598 A1 | * | 10/2003 | DiRoma | A61F 7/03 |
| | | | | 607/114 |
| 2012/0138848 A1 | * | 6/2012 | Leavitt | C09K 5/066 |
| | | | | 252/69 |
| 2013/0199209 A1 | * | 8/2013 | Hensen | C09K 5/063 |
| | | | | 62/4 |
| 2014/0371828 A1 | * | 12/2014 | Whitely | A61F 7/106 |
| | | | | 607/108 |
| 2015/0114592 A1 | * | 4/2015 | Ide | C09K 5/063 |
| | | | | 165/10 |

FOREIGN PATENT DOCUMENTS

| | | | | |
|---|---|---|---|---|
| JP | 2000-256659 A | * | 9/2000 | C09K 5/06 |
| WO | 2014/091938 | | 6/2014 | |

\* cited by examiner

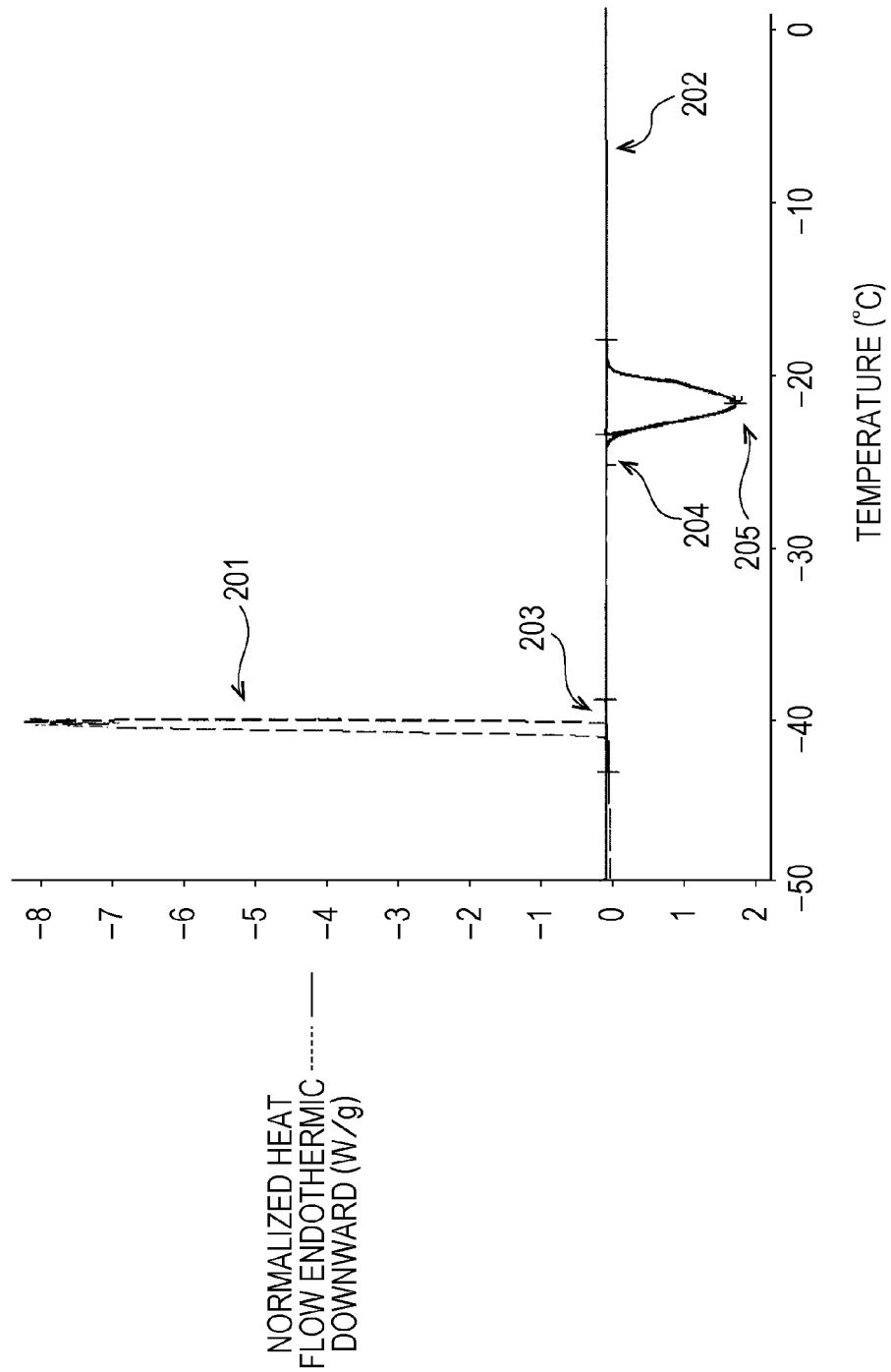

LATENT HEAT COLD STORAGE MATERIAL

BACKGROUND

1. Technical Field

The present disclosure relates to a latent heat cold storage material that is used in storage and transportation of, for example, fresh foods. The latent heat cold storage material is filled into a cold storage vessel, and cooled in a freezer before being used.

2. Description of the Related Art

A mechanism of distributing products while maintaining a low-temperature state, a refrigerated state or a frozen state consistently from a production area to a consumption area is called a cold chain. The cold chain is now used in various fields including not only those of fresh products and frozen foods but also those of cut flowers, pharmaceuticals, electronic components and so on, but previous mechanisms have many problems. Particularly significant problems include energy costs for cooling apparatuses, an increase in $CO_2$ emission, severity of work at cargo handling sites, and difficulty in managing different temperature zones. In particular, it has been pointed out that refrigeration and freezing trucks are provided with a cooling apparatus, and accordingly require a high transportation cost, and are mostly large trucks, thus being unsuitable for transportation of small lots. Meanwhile, in the case of transportation using dry ice, low-temperature products can be transported together with normal-temperature products to keep the cost low. However, there are inevitable problems that products are carried at −79° C., i.e. a sublimation temperature, and therefore frozen to be degraded, that products cannot be kept at a constant temperature, that dry ice must be discarded after being used only once, that $CO_2$ is generated in vaporization, and so on.

As a technique for solving these problems, heat storage materials have been considered to be promising, and partially put into practical use. The heat storage material is a material which stores heat or cold heat in a substance, and effectively utilizes entry and exit of heat as required. Particularly, a heat storage material which mainly utilizes an exothermic/endothermic reaction associated with a phase change in a substance is called a latent heat storage material, and particularly, a heat storage material which stores cold heat beforehand, and is allowed to cool as required is called a latent heat cold storage material (hereinafter, also referred to simply as a "cold storage material"), but there is no clear distinction between the heat storage material and the cold storage material. Of latent heat cold storage materials, those having as a cold storage medium an inorganic substance-based material such as an inorganic salt or an inorganic hydrated salt have advantages that they have a higher heat conductivity, a larger latent heat amount and a smaller volume change in comparison with organic substance-based materials, and that they are incombustible. Among latent heat cold storage materials, an aqueous sodium chloride solution also has advantages that it has no toxicity and low reactivity, is readily available, and has moderate solubility and a eutectic temperature close to a frozen food preservation temperature. Therefore, these cold storage materials can be especially suitably used in refrigeration of foods, cooling during delivery, refrigeration of chemicals and pharmaceuticals, and cooling processes in food plants. PTL 1 describes a latent heat cold storage material of which melting temperature can be adjusted as desired using sodium chloride.

Cold storage materials are classified mainly into those for refrigeration and those for freezing depending on a use temperature range of the materials, and when a cold storage material for freezing is used, handling is easy because there is no possibility of releasing $CO_2$ in vaporization unlike in dry ice, and there is no risk of low-temperature burns, and electric energy is required only during cooling of the cold storage material.

Conventional cold storage materials for freezing include aqueous solutions in which a plurality of electrolytes are dissolved, and specifically, for example, a mixed aqueous solution of sodium chloride and ammonium chloride as disclosed in PTL 2 is used.

CITATION LIST

Patent Literatures

PTL 1: Unexamined Japanese Patent Publication No. 11-35933

PTL 2: International Patent Publication No. WO 2014/091938

SUMMARY

One non-limiting and embodiment provides a cold storage material which is suitable for freezing preservation in a temperature range of −10° C. or lower, and is slightly supercooled in order to reduce electric energy required for cooling.

In one general aspect, the techniques disclosed here feature a latent heat cold storage material containing:
water;
a crystalline powder; and
at least one inorganic salt,
wherein the crystalline powder is formed of a compound with a saturated concentration of less than 7.0 wt % to an aqueous solution of the inorganic salt with a concentration of 25 wt % at 25° Cl; and
a concentration of the crystalline powder exceeds a saturated concentration of the crystalline powder to the aqueous solution of the inorganic salt at 25° C.

The present disclosure provides a latent heat cold storage material which is suitable for freezing preservation in a temperature range of −10° C. or lower, and is slightly supercooled in order to reduce electric energy required for cooling.

BRIEF DESCRIPTION OF THE DRAWINGS

FIG. 2 is a graph showing a result of differential scanning calorimetry of cold storage material C-1 in a conventional technique.

DETAILED DESCRIPTION

Figure 1:
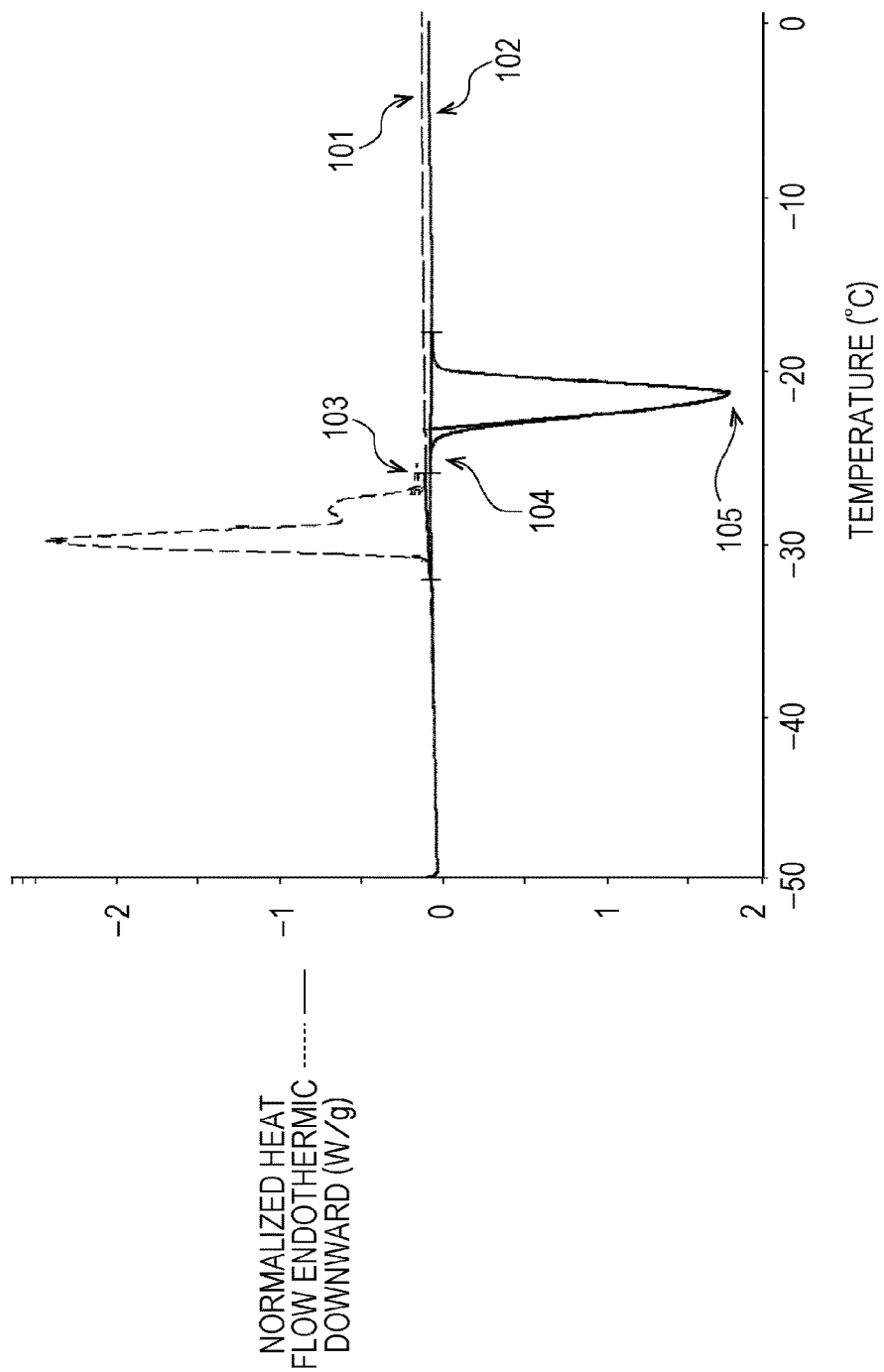
FIG. 1 is a graph showing a result of differential scanning calorimetry of cold storage material A-1 according to an embodiment of the present disclosure.

The latent heat cold storage material as described in PTL 1 has a high melting temperature of about −10° C., and hence has an endothermic peak of higher than −10° C., and is therefore not suitable for freezing preservation at −10° C. or lower, or is largely supercooled, and is therefore required to be cooled to about −40° C. for being cold-stored (solidified). In the configuration of a mixed aqueous solution of sodium chloride and ammonium chloride as disclosed in PTL 2 the latent heat cold storage material is significantly supercooled, and is therefore required to be cooled to about −40° C. for being cold-stored (solidified). The supercooling is a phenomenon that in a cooling process of a liquid, no phase change occurs even at a temperature at which a phase change should inherently occur to change the liquid into a solid, and the temperature decreases in a liquid state.

Thus, a conventional cold storage material for freezing, i.e. a system in which ammonium chloride is mixed with sodium chloride, has a problem that it is necessary to cool the cold storage material to a temperature lower by 20 to 30 K than a temperature at which cold heat is required, so that excessive electric energy is required for cooling.

A first aspect of the present disclosure provides a latent heat cold storage material containing: water; a crystalline powder; and at least one inorganic salt. The crystalline powder is formed of a compound with a saturated concentration of less than 7.0 wt % to an aqueous solution of the inorganic salt with a concentration of 25 wt % at 25° C. A concentration of the crystalline powder exceeds a saturated concentration of the crystalline powder to the aqueous solution of the inorganic salt at 25° C.

According to the latent heat cold storage material of the first aspect, a cold storage material suitable for freezing preservation at −10° C. or lower can be cold-stored (solidified) at −29° C. or higher. Thus, a lower limit of a cooling temperature (solidification starting temperature) for cold storage can be increased from near −40° C. to −29° C. or higher to considerably reduce electric energy required for cooling.

A second aspect of the present disclosure provides, for example, the latent heat cold storage material according to the first aspect, wherein the crystalline powder is formed of a urea derivative represented by the following chemical formula (1). According to the second aspect, a difference between a solidification starting temperature and a melting starting temperature can be decreased.

[Chemical formula]

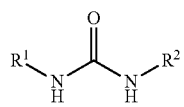

(1)

In the formula, $R^1$ and $R^2$ are identical or mutually different, and each represent a hydrocarbon group having 2 to 20 carbon atoms.

A third aspect of the present disclosure provides, for example, the latent heat cold storage material according to the second aspect, wherein $R^1$ and $R^2$ are identical or mutually different, and each represent an alkyl group having 2 to 6 carbon atoms or a cycloalkyl group having 3 to 6 carbon atoms. According to the third aspect, a difference between the solidification starting temperature and the melting starting temperature can be further decreased.

A fourth aspect of the present disclosure provides, for example, the latent heat cold storage material according to the first aspect, wherein the crystalline powder is formed of at least one urea derivative selected from the group consisting of 1,3-diethylurea, 1,3-dibutylurea and 1,3-dicyclohexylurea. According to the fourth aspect, a difference between the solidification starting temperature and the melting starting temperature can be further decreased.

A fifth aspect of the present disclosure provides, for example, the latent heat cold storage material according to the first aspect, wherein the crystalline powder is formed of 1,3-diethylurea or 1,3-dibutylurea. According to the fifth aspect, a difference between the solidification starting temperature and the melting starting temperature can be further decreased.

A sixth aspect of the present disclosure provides, for example, the latent heat cold storage material according to any one of the first to fifth aspects, wherein the inorganic salt includes sodium chloride. According to the sixth aspect, there can be provided a cold storage material which has a small difference between the solidification starting temperature and the melting starting temperature, and is suitable for freezing preservation at −18° C. or lower.

A seventh aspect of the present disclosure provides, for example, the latent heat cold storage material according to any one of the first to fifth aspects, wherein the inorganic salt includes potassium chloride. According to the seventh aspect, there can be provided a cold storage material which has a small difference between the solidification starting temperature and the melting starting temperature, and is suitable for freezing preservation at −20° C. to −10° C. (both inclusive).

An eighth aspect of the present disclosure provides, for example, the latent heat cold storage material according to any one of the first to seventh aspects, wherein the inorganic salt is at least one selected from the group consisting of sodium chloride, ammonium chloride, sodium hydrogen carbonate, potassium hydrogen carbonate, ammonium hydrogen carbonate, disodium phosphate and trisodium phosphate. According to the eighth aspect, a difference between the solidification starting temperature and the melting starting temperature can be further decreased to considerably reduce electric energy required for cooling.

A ninth aspect of the present disclosure provides, for example, the latent heat cold storage material according to any one of the first to fifth aspects, wherein the inorganic salt includes sodium chloride and ammonium chloride. According to the ninth aspect, a difference between the solidification starting temperature and the melting starting temperature can be further decreased to considerably reduce electric energy required for cooling.

A tenth aspect of the present disclosure provides, for example, the latent heat cold storage material according to any one of the first to fifth aspects, wherein the inorganic salt includes potassium chloride and ammonium chloride. According to the tenth aspect, a difference between the solidification starting temperature and the melting starting temperature can be further decreased to considerably reduce electric energy required for cooling.

Hereinafter, an embodiment of the present disclosure will be described with reference to the drawings. The following descriptions pertain to one example of the present disclosure, and the present disclosure is not limited thereto.

The latent heat cold storage material of the present disclosure contains: water; a crystalline powder; and at least one inorganic salt. The crystalline powder is formed of a compound having a saturated concentration of less than 7.0 wt % to an aqueous solution of the inorganic salt having a concentration of 25 wt % at 25° C. A concentration of the crystalline powder is set to a concentration exceeding at least a saturated concentration (of the crystalline powder) to the aqueous solution of the inorganic salt at 25° C. A crystalline powder to be used as a supercooling inhibitor is preferably one that has no toxicity, and is inexpensive and easy to handle. One crystalline powder may be used alone, or two or more crystalline powders may be used in combination.

The latent heat cold storage material of the present disclosure contains a crystalline powder as a supercooling inhibitor. The crystalline powder is formed of a compound having low solubility in an aqueous solution of an inorganic salt (hereinafter, also referred to as a low-solubility compound). In the present disclosure, the phrase "low solubility in an aqueous solution of an inorganic salt" means that a saturated concentration of an object compound to an aqueous solution of an inorganic salt (preferably an aqueous solution containing only 15 wt % of sodium chloride and 10 wt % of ammonium chloride) having a concentration of 25 wt % at 25° C. is less than 7.0 wt %, i.e. such solubility that when 7.0 wt % of the object compound is added to the inorganic salt aqueous solution, the object compound is not fully dissolved, and a powder residue exists. The low-solubility compound is preferably one in which the saturated concentration of an object compound to an aqueous solution of an inorganic salt (preferably an aqueous solution containing only 15 wt % of sodium chloride and 10 wt % of ammonium chloride) having a concentration of 25 wt % at 25° C. is less than 5.0 wt %, more preferably less than 4.0 wt %.

A content (i.e., total amount) of the crystalline powder in the latent heat cold storage material of the present disclosure is preferably an amount that exceeds a saturated concentration of the crystalline powder to an inorganic salt aqueous solution (preferably an aqueous solution containing only 15 wt % of sodium chloride and 10 wt % of ammonium chloride) having a concentration of 25 wt % at 25° C. When a crystalline powder having a concentration exceeding a saturated concentration of the crystalline powder is added, a powder that is not dissolved at 25° C. remains. With cooling, dissolved crystalline components are quickly precipitated with the powder residue as a nucleus. Crystallization of the inorganic salt aqueous solution is promoted with the precipitated crystals as a quasi-nucleus, and resultantly a solidification point increases. An upper limit of the concentration of the crystalline powder is not particularly limited, but when the amount of the dissolved supercooling inhibitor is large, harmful effects such as a decrease in latent heat amount and a decrease in melting point may often occur, and therefore the concentration of the crystalline powder is preferably 10.0 wt % or less, more preferably 9.0 wt % or less, further preferably 8.0 wt % or less.

In the embodiment of the present disclosure, the crystalline powder has a nature of exhibiting a phenomenon that the crystalline powder is precipitated from an aqueous solution of an inorganic salt with an added amount (of the crystalline powder) that is as small as possible.

In the present disclosure, the "solubility" refers to a limit of an amount at which a solute is dissolved in a certain amount of a solvent. The solubility is represented by a mass (g) of the solute which is dissolved in 100 g of the solvent at a certain temperature. For example, with water as a solvent, the solubility is represented by a mass (g) of a solute which is dissolved in 100 g of water at 25° C. In the present disclosure, the "saturated concentration" refers to a concentration of an aqueous solution in which a solute is dissolved up to the solubility. When the limit of an amount at which a solute is dissolved in 100 g of a solvent is 20 g, the solubility is 20 g, and the saturated concentration of the solute is 16.7 wt %.

The low-solubility compound that forms the crystalline powder is preferably a urea derivative represented by the following chemical formula (1).

[Chemical formula]

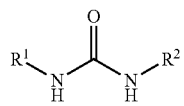

(1)

where $R^1$ and $R^2$ are identical or mutually different, and each represent a hydrocarbon group having 2 to 20 carbon atoms.

Since the urea derivative has an amide bond, and has a plane structure due to a double-bond character of the amide bond, the urea derivative has high crystallinity. Further, the urea derivative is suitable for promotion of crystallization of the inorganic salt aqueous solution because hydrophobic groups $R^1$ and $R^2$ having an effect of remarkably reducing solubility act to increase a probability of generation of crystals associated with cooling, and to increase a precipitation rate. Accordingly, a solidification point more reliably increases. Further, it is preferable that $R^1$ and $R^2$ are the same because a symmetric property is also imparted, so that crystallinity is further improved.

Examples of the hydrocarbon groups having 2 to 20 carbon atoms as $R^1$ and $R^2$ in formula (1) include aliphatic hydrocarbon groups having 2 to 20 carbon atoms and aromatic hydrocarbon groups (i.e., aryl groups) having 6 to 20 carbon atoms, and aliphatic hydrocarbon groups having 2 to 20 carbon atoms are preferable. The aliphatic hydrocarbon group having 2 to 20 carbon atoms is preferably a saturated aliphatic hydrocarbon group having 2 to 20 carbon atoms, more preferably an alkyl group having 2 to 20 carbon atoms or a cycloalkyl group having 3 to 20 carbon atoms, further preferably an alkyl group having 2 to 10 carbon atoms or a cycloalkyl group having 3 to 10 carbon atoms, especially preferably an alkyl group having 2 to 6 carbon atoms or a cycloalkyl group having 3 to 6 carbon atoms.

Examples of the alkyl group include a methyl group, an ethyl group, an n-propyl group, an isopropyl group, an n-butyl group, an isobutyl group, a sec-butyl group, a 2-methylpropyl group, a tert-butyl group, an n-pentyl group, an isopentyl group, an n-hexyl group, an n-heptyl group and an n-octyl group. Examples of the cycloalkyl group include a cyclopropyl group, a cyclobutyl group, a cyclopentyl group and a cyclohexyl group. Examples of the aryl group include a phenyl group and a naphthyl group.

The hydrocarbon group as $R^1$ and $R^2$ may be substituted with a substituent, but is preferably unsubstituted. The substituent is not particularly limited, and examples thereof include linear or branched alkyl groups having 1 to 6 carbon atoms. Examples of the alkyl group include a methyl group, an ethyl group, an n-propyl group, an isopropyl group and an n-butyl group.

Preferably, the crystalline powder is formed of at least one urea derivative selected from the group consisting of 1,3-diethylurea, 1,3-butylurea and 1,3-dicyclohexylurea. More preferably, the crystalline powder is formed of 1,3-diethylurea or 1,3-butylurea. The solubility of 1,3-diethylurea in an inorganic salt aqueous solution is low, and when an inorganic salt concentration of an aqueous solution containing at least one inorganic salt is 10 to 30 wt %, the solubility of 1,3-diethylurea in the inorganic salt aqueous solution at normal temperature is 10 wt % or less. As the solubility decreases, the added amount of the crystalline powder as a supercooling inhibitor becomes smaller, so that material costs can be reduced.

When 1,3-diethylurea is contained as the crystalline powder, the content (i.e, total amount) thereof is preferably not less than 0.1 wt % and not more than 20 wt %, more preferably not less than 0.5 wt % and not more than 15 wt %, further preferably not less than 1 wt % and not more than 10 wt % based on the total of the latent heat cold storage material.

The added amount of the crystalline powder is such an amount that the concentration of the crystalline powder slightly exceeds the saturated concentration near an upper limit of a use temperature range, and thus a powder residue exists. Accordingly, with cooling, dissolved crystalline components are quickly precipitated with the powder residue as a nucleus. Crystallization of the inorganic salt aqueous solution is promoted with the precipitated crystals as a quasi-nucleus.

The crystalline powder in the present disclosure may include a crystalline powder formed of a compound other than the urea derivative of the chemical formula (1).

In the latent heat cold storage material of the present disclosure, the content (i.e., total amount) of the inorganic salt is not less than 10 wt % and not more than 67 wt %, preferably not less than 15 wt % and not more than 60 wt %, more preferably not less than 20 wt % and not more than 50 wt % based on a total weight (i.e., 100 wt %) of water contained in the latent heat cold storage material. When the concentration of the inorganic salt is not less than 10 wt % and not more than 67 wt %, a cold storage material that is desirable in terms of a latent heat amount and a melting temperature is obtained. When the content of the inorganic salt is more than 67 wt %, the latent heat amount considerably decreases to the degree that a latent heat amount of 210 J/g or more cannot be obtained. Further, the melting temperature decreases to −30° C. or lower, so that the latent heat cold storage material is unsuitable for freezing use. A purity of the inorganic salt is not particularly limited, and normally, an inorganic salt having a purity of 90% or more is used.

The content (i.e., total amount) of the inorganic salt is preferably not less than 9 wt % and not more than 65 wt %, more preferably not less than 12 wt % and not more than 60 wt %, further preferably not less than 15 wt % and not more than 50 wt % based on the total of the cold storage material.

In the latent heat cold storage material of the present disclosure, it is preferable that the inorganic salt includes at least one selected from the group consisting of an alkali metal salt, an alkaline earth metal salt and an ammonium halide. Examples of the alkali metal salt include sodium chloride, potassium chloride and lithium chloride. Examples of the alkaline earth metal salt include magnesium chloride, calcium chloride and barium chloride. For freezing preservation at −18° C. or lower, a combination of sodium chloride (as a main agent) and ammonium chloride (as a sub-agent) is more preferable. For freezing preservation at not less than −20° C. to not more than −10° C., a combination of potassium chloride (as a main agent) and ammonium chloride (as a sub-agent) is more preferable. In the latent heat cold storage material according to the embodiment of the present disclosure, a content of the sub-agent is lower than a content of the main agent.

A supercooling inhibitor other than a urea derivative may be added to the latent heat cold storage material of the present disclosure. The supercooling inhibitor to be used is not particularly limited, but inexpensive and readily available industrial products such as porous materials including zeolite and silica gel are preferable. They may be used alone, or used in combination of two or more thereof.

Further, the latent heat cold storage material of the present disclosure may contain various kinds of known additives. As additives, those that are known can be used, such as, for example, viscosity modifiers, foam stabilizers, antioxidants, defoaming agents, abrasive grains, fillers, pigments, dyes, colorants, thickeners (i.e., gelling agents), surfactants, flame retardants, plasticizers, lubricants, antistatic agents, heat-resistance stabilizers, tackifiers, curing catalysts, stabilizers, silane coupling agents and waxes. As the thickener, mention is made of polyvinyl alcohol-based thickeners, cellulose-based thickeners, polysaccharide-based thickeners and so on in view of improvement of safety in case of leakage, and they may be used alone, or used in combination of two or more thereof. Types and use amounts of these various kinds of additives are not particularly limited as long as a purpose of the present disclosure is not hindered.

The melting starting temperature (hereinafter, also referred to as a melting starting point), the endothermic peak and the solidification starting temperature (hereinafter, also referred to as a solidification starting point) in the latent heat cold storage material according to this embodiment can be measured by differential scanning calorimetry (hereinafter, referred to as "DSC") in accordance with Japanese Industrial Standards K 7121 (2012). A known differential scanning calorimeter can be used for differential scanning calorimetry. As the differential scanning calorimeter, for example, Power Compensation-type Double-Furnace DSC 8500 from PerkinElmer Japan Co., Ltd. can be used. Measurement conditions are as described later in examples. From measurement results, solidification starting point 103, melting starting point 104 and endothermic peak 105 can be identified as shown in FIG. 1. The endothermic peak means a peak appearing as a bottom point of a shape projected downward from a baseline due to a change in heat amount in a measurement result of differential scanning calorimetry (DSC). When there are a plurality of peaks, the endothermic peak means an average of all the peaks. In FIG. 1, temperature-fall curve 101 in differential scanning calorimetry is shown by a broken line, and temperature-rise curve 102 in differential scanning calorimetry is shown by a solid line.

The melting starting temperature in the latent heat cold storage material with sodium chloride as a main agent according to this embodiment is preferably in a range of not less than −27° C. and not more than −22° C. The endothermic peak in melting in the latent heat cold storage material with sodium chloride as a main agent according to this embodiment is preferably in a range of not less than −25° C. and no more than −20° C. The solidification starting temperature in the latent heat cold storage material with sodium chloride as a main agent according to this embodiment is preferably in a range of −29° C. or higher and lower than the melting starting temperature.

The melting starting temperature in the latent heat cold storage material with potassium chloride as a main agent according to this embodiment is preferably in a range of not less than −21° C. and not more than −16° C. The endothermic peak in melting in the latent heat cold storage material with potassium chloride as a main agent according to this embodiment is preferably in a range of not less than −19° C. and not more than −14° C. The solidification starting temperature in the latent heat cold storage material with potassium chloride as a main agent according to this embodiment is preferably in a range of −25° C. or higher and lower than the melting starting temperature.

In the latent heat cold storage material with sodium chloride as a main agent according to this embodiment, a difference between the melting starting temperature and the solidification starting temperature is preferably 7° C. or less, more preferably 6° C. or less, further preferably 5° C. or less.

In the latent heat cold storage material with potassium chloride as a main agent according to this embodiment, a difference between the melting starting temperature and the solidification starting temperature is preferably 7° C. or less.

The latent heat cold storage material with sodium chloride as a main agent according to this embodiment is especially preferably one that is crystallized (i.e., formed into a solid phase) at −29° C. or higher when cooled (i.e., cold-stored), and has a melting starting temperature in a range of not less than −27° C. and not more than −22° C. when allowed to release heat (i.e., allowed to cool).

The latent heat cold storage material with potassium chloride as a main agent according to this embodiment is especially preferably one that is crystallized (i.e., formed into a solid phase) at −25° C. or higher when cooled (i.e., cold-stored), and has a melting starting temperature in a range of not less than −21° C. and not more than −16° C. when allowed to release heat (i.e., allowed to cool).

In the latent heat cold storage material with sodium chloride as a main agent and the latent heat cold storage material with potassium chloride as a main agent according to this embodiment, a latent heat amount is preferably 210 J/g or more, more preferably 220 J/g or more, further preferably 230 J/g or more. An upper limit of the latent heat amount is not particularly limited, and may be 330 J/g or less. The latent heat amount can be measured by DSC in accordance with Japanese Industrial Standards K 7122 (2012). A known differential scanning calorimeter can be used for differential scanning calorimetry. As the differential scanning calorimeter, for example, Input Compensation-type Double-Furnace DSC 8500 from PerkinElmer Japan Co., Ltd. can be used to perform measurement. Measurement conditions are as described later in examples.

A method for manufacturing a latent heat cold storage material is not particularly limited, and examples thereof include a method in which to pure water or ion-exchanged water in a vessel is slowly added an inorganic salt up to a predetermined amount with stirring, the mixture is sufficiently mixed, a crystalline powder according to this embodiment is then slowly added up to a predetermined amount with stirring, and concurrently with or before or after addition of the crystalline powder, other additives are added, followed by mixing and/or stirring the mixture; and a method in which an inorganic salt and additives are mixed beforehand, and injected into pure water or ion-exchanged water, and finally a thickener and a crystalline powder are added. The inorganic salt, the crystalline powder and other additives may be added in any order, and can be heated to a certain temperature for promoting dissolution. In heating, care should be taken so as not to cause a failure such as decomposition of a solute. For example, when a urea derivative is used in the crystalline powder, the heating temperature is preferably lower than 60° C. because if heating is performed for a long time at a temperature of 60° C. to 80° C. or higher, urea may be decomposed to generate ammonia.

A form of the cold storage material is not particularly limited, but normally a cold storage material prepared as described above is enclosed in a metal or resin material excellent in corrosion resistance. As a shape of the cold storage material, mention is made of a lump shape, a plate shape, or a sheet shape. As a ratio of a surface area to an inner volume is increased, responsiveness of cold storage and cooling is improved. A place where the cold storage material is disposed after being stored in a freezer may be in an inside of a vessel such as a box or container for transportation/storage.

Preferably, the use environment is kept at a temperature equal to or lower than normal temperature. Since the cold storage material is intended for freezing, generally, the cold storage material is circularly and repeatedly placed in a freezer and at normal temperature, and is hardly exposed under a high-temperature environment at 40° C. or higher for a long time. However, when a urea derivative is used in the crystalline powder, urea may be partially decomposed to generate ammonia if the cold storage material is left standing at 60° C. or higher for a long time.

EXAMPLES

Hereinafter, the cold storage material of the present disclosure will be described in detail by way of examples. However, the present disclosure is not limited to the following examples.

Evaluation criteria for the latent heat cold storage material with sodium chloride as a main agent in the present disclosure are shown below. The latent heat cold storage material is required to have an endothermic peak of not less than −25° C. and not more than −20° C. when used for freezing preservation in a temperature range of −18° C. or lower. The melting starting temperature is preferably not less than −27° C. and not more than −22° C. in terms of the endothermic peak. Further, for reducing electric energy required for cold storage, and thus a cooling cost, the solidification starting temperature is required to be much higher than −40° C. as much as possible, and is preferably −29° C. or higher. Further, the latent heat amount is required to be 210 J/g or more from the viewpoint of practical utility. For measurement of the melting starting temperature, the endothermic peak, the solidification starting temperature and the latent heat amount, Input Compensation-type Double-Furnace DSC 8500 from PerkinElmer Japan Co., Ltd. was used.

<Evaluation Criteria of Solidification Starting Temperature>
◯: −29.0° C. or higher
x: lower than −29.0° C.
<Evaluation Criteria of Endothermic Peak>
◯: not less than −25.0° C. and not more than −20.0° C.
x: lower than −25.0° C. or higher than −20.0° C.
<Evaluation Criteria of Melting Starting Temperature>
◯: not less than −27.0° C. and not more than −22.0° C.
x: lower than −27.0° C. or higher than −22.0° C.
<Evaluation Criteria of Latent Heat Amount>
◯: 210 J/g or more
x: less than 210 J/g The above evaluation results were totally evaluated, and samples which were suitable as a cold storage material for freezing as a difference between the solidification starting temperature and the melting starting temperature was 7° C. or less were rated "◯," while samples which were not suitable as a cold storage material for freezing were rated "x" in total evaluation.

Example 1 and Comparative Examples 1 to 6

To an aqueous solution of 15 wt % of sodium chloride and 10 wt % of ammonium chloride was added 1,3-diethylurea as a crystalline powder in an amount as shown in Table 1, and the mixture was stirred and homogeneously mixed to prepare a latent heat cold storage material. A saturated concentration of 1,3-diethylurea at 25° C. to an aqueous solution containing only 15 wt % of sodium chloride and 10 wt % of ammonium chloride is 3.0 wt %.

For obtained latent heat cold storage materials A-1 and C-1 to C-6, a melting starting temperature, an endothermic peak, a solidification starting temperature and a latent heat amount were measured under the following conditions using a differential scanning calorimeter (Input Compensation-type Double-Furnace DSC 8500 from PerkinElmer Japan Co., Ltd.). Results for latent heat cold storage materials A-1 and C-1 to C-6 are shown in Tables 1-3. DSC results for cold storage material A-1 are shown in FIG. 1, and DSC results for cold storage material C-1 are shown in FIG. 2.

DSC program: temperature-fall rate 1° C./minute→holding at −50° C. for 10 minutes→temperature rise rate 1° C./minute→10° C.

TABLE 1

| Composition | Water (g) | Inorganic salts NaCl (g) | NH$_4$Cl (g) | Crystalline powder 1,3-diethylurea (mmol) | (mg) |
|---|---|---|---|---|---|
| C-1 | 0.75 | 0.15 | 0.10 | 0.00 | 0.0 |
| C-2 | 0.75 | 0.15 | 0.10 | 0.01 | 1.3 |
| C-3 | 0.75 | 0.15 | 0.10 | 0.06 | 6.4 |
| C-4 | 0.75 | 0.15 | 0.10 | 0.17 | 19.3 |
| C-5 | 0.75 | 0.15 | 0.10 | 0.22 | 25.8 |
| C-6 | 0.75 | 0.23 | 0.00 | 0.00 | 0.0 |
| A-1 | 0.75 | 0.15 | 0.10 | 0.33 | 38.7 |

TABLE 2

Results of differential scanning calorimetry

| Composition | Melting starting point (° C.) | Evaluation | Endothermic peak (° C.) | Evaluation |
|---|---|---|---|---|
| C-1 | −24.0 | ○ | −21.5 | ○ |
| C-2 | −25.0 | ○ | −20.7 | ○ |
| C-3 | −24.0 | ○ | −20.9 | ○ |
| C-4 | −24.0 | ○ | −21.0 | ○ |
| C-5 | −24.0 | ○ | −21.0 | ○ |
| C-6 | −21.0 | x | −18.2 | x |
| A-1 | −24.0 | ○ | −21.3 | ○ |

TABLE 3

Results of differential scanning calorimetry

| Composition | Solidification starting point (° C.) | Evaluation | Latent heat amount (J/g) | Evaluation | Total evaluation |
|---|---|---|---|---|---|
| C-1 | −40.0 | x | 254.0 | ○ | x |
| C-2 | −43.0 | x | 237.0 | ○ | x |
| C-3 | −42.0 | x | 241.0 | ○ | x |
| C-4 | −43.0 | x | 248.7 | ○ | x |
| C-5 | −42.0 | x | 230.2 | ○ | x |
| C-6 | −37.0 | x | 267.0 | ○ | x |
| A-1 | −28.5 | ○ | 233.1 | ○ | ○ |

Latent heat cold storage material A-1 (Example 1) contains 0.33 mmol of 1,3-diethylurea as a crystalline powder, and has a melting starting point in a range of not less than −25.0° C. and not more than −19.0° C., an endothermic peak of not less than −25.0° C. and not more than −20.0° C., a solidification starting temperature of −32.0° C. or higher, and a latent heat amount of 230 J/g or more. Therefore, latent heat cold storage material A-1 satisfies all the evaluation criteria, and is suitable for use in freezing preservation in a temperature range of −18° C. or lower.

Latent heat cold storage material C-1 is an aqueous solution containing 15 wt % of sodium chloride and 10 wt % of ammonium chloride as a conventional cold storage material composition (G2 in FIG. 5 in International Patent Publication No. WO 2014/091938), and does not contain a crystalline powder. Latent heat cold storage material C-1 has a melting starting point of −24.0° C., endothermic peak of −21.5° C., and a high latent heat amount of 254 J/g, but has a low solidification starting point of −40.0° C., and thus a large difference between the solidification starting temperature and the melting starting temperature.

Latent heat cold storage material C-2 contains 0.01 mmol of 1,3-diethylurea, and has a melting starting point of −25.0° C., an endothermic peak of −20.7° C. and a latent heat amount of 237 J/g, but has a low solidification starting point of −43.0° C., and thus has a large difference between the solidification starting temperature and the melting starting temperature.

Latent heat cold storage material C-3 contains 0.06 mmol of 1,3-diethylurea, and has a melting starting point of −24.0° C., an endothermic peak of −20.9° C. and a latent heat amount of 241 J/g, but has a low solidification starting point of −42.0° C., and thus has a large difference between the solidification starting temperature and the melting starting temperature.

Latent heat cold storage material C-4 contains 0.17 mmol of 1,3-diethylurea, and has a melting starting point of −24.0° C., an endothermic peak of −21.0° C. and a latent heat amount of 249 J/g, but has a low solidification starting point of −43.0° C., and thus has a large difference between the solidification starting temperature and the melting starting temperature.

Latent heat cold storage material C-5 contains 0.22 mmol of 1,3-diethylurea, and has a melting starting point of −24.0° C., an endothermic peak of −21.0° C. and a latent heat amount of 230 J/g, but has a low solidification starting point of −42.0° C., and thus has a large difference between the solidification starting temperature and the melting starting temperature.

Latent heat cold storage material C-6 does not contain ammonium chloride and a crystalline powder, and is formed of a 23 wt % aqueous solution of sodium chloride. Latent heat cold storage material C-6 has a melting starting point of −21.0° C. and an endothermic peak of −18.2° C., and thus does not satisfy evaluation criteria, and also, has a low solidification starting point of −37.0° C., and thus a large difference between the solidification starting temperature and the melting starting temperature.

In the above evaluation, latent heat cold storage material A-1 shows desirable results as a cold storage material composition.

Examples 2 to 7

Except that blending amounts of ammonium chloride and 1,3-diethylurea were changed to amounts as shown in Table 4, the same procedure as in Example 1 was carried out to prepare latent heat cold storage materials A-2 to A-7. Latent heat cold storage materials A-2 to A-7 showed desirable results as with latent heat cold storage material A-1. Results are shown in Tables 4-6

TABLE 4

| Composition | Water (g) | Inorganic salts NaCl (g) | NH$_4$Cl (g) | Crystalline powder 1,3-diethylurea (mmol) | (mg) |
|---|---|---|---|---|---|
| A-2 | 0.75 | 0.15 | 0.10 | 0.44 | 51.6 |
| A-3 |  |  |  | 0.55 | 64.5 |
| A-4 |  |  | 0.06 | 0.33 | 38.7 |
| A-5 |  |  | 0.08 | 0.33 | 38.7 |
| A-6 |  |  | 0.12 | 0.33 | 38.7 |
| A-7 |  |  | 0.14 | 0.33 | 38.7 |

TABLE 5

Results of differential scanning calorimetry

| Composition | Melting starting point (° C.) | Evaluation | Endothermic peak (° C.) | Evaluation |
|---|---|---|---|---|
| A-2 | −23.1 | ○ | −21.1 | ○ |
| A-3 | −23.2 | ○ | −21.5 | ○ |
| A-4 | −23.3 | ○ | −21.6 | ○ |
| A-5 | −23.4 | ○ | −21.6 | ○ |
| A-6 | −23.4 | ○ | −21.5 | ○ |
| A-7 | −23.3 | ○ | −21.5 | ○ |

TABLE 6

Results of differential scanning calorimetry

| Composition | Solidification starting point (° C.) | Evaluation | Latent heat amount (J/g) | Evaluation | Total evaluation |
|---|---|---|---|---|---|
| A-2 | −27.0 | ○ | 244.6 | ○ | ○ |
| A-3 | −28.5 | ○ | 249.8 | ○ | ○ |
| A-4 | −28.0 | ○ | 254.1 | ○ | ○ |
| A-5 | −27.0 | ○ | 251.6 | ○ | ○ |
| A-6 | −28.0 | ○ | 246.8 | ○ | ○ |
| A-7 | −29.5 | ○ | 243.2 | ○ | ○ |

Latent heat cold storage material A-2 contains 0.44 mmol of 1,3-diethylurea, and latent heat cold storage material A-3 contains 0.55 mmol of 1,3-diethylurea. Latent heat cold storage materials A-2 and A-3 have a melting starting point in a range of not less than −25.0° C. and not more than −19.0° C., an endothermic peak of not less than −25.0° C. and not more than −20.0° C., a solidification starting temperature of −32.0° C. or higher, and a latent heat amount of 230 J/g or more. Therefore, latent heat cold storage materials A-2 and A-3 satisfy all the evaluation criteria, and are suitable for use in freezing preservation in a temperature range of −18° C. or lower.

Latent heat cold storage material A-4 contains 0.33 mmol of 1,3-diethylurea in an aqueous solution of 15 wt % of sodium chloride and 6 wt % of ammonium chloride, and has a melting starting point in a range of not less than −25.0° C. and not more than −19.0° C., an endothermic peak of not less than −25.0° C. and not more than −20.0° C., a solidification starting temperature of −32.0° C. or higher, and a latent heat amount of 230 J/g or more. Therefore, latent heat cold storage material A-4 satisfies all the evaluation criteria, and is suitable for use in freezing preservation in a temperature range of −18° C. or lower.

Latent heat cold storage material A-5 contains 0.33 mmol of 1,3-diethylurea in an aqueous solution of 15 wt % of sodium chloride and 8 wt % of ammonium chloride, and has a melting starting point in a range of not less than −25.0° C. and not more than −19.0° C., an endothermic peak of not less than −25.0° C. and not more than −20.0° C., a solidification starting temperature of −32.0° C. or higher, and a latent heat amount of 230 J/g or more. Therefore, latent heat cold storage material A-5 satisfies all the evaluation criteria, and is suitable for use in freezing preservation in a temperature range of −18° C. or lower.

Latent heat cold storage material A-6 contains 0.33 mmol of 1,3-diethylurea in an aqueous solution of 15 wt % of sodium chloride and 12 wt % of ammonium chloride, and has a melting starting point in a range of not less than 25.0° C. and not more than −19.0° C., an endothermic peak of not less than −25.0° C. and not more than −20.0° C., a solidification starting temperature of −32.0° C. or higher, and a latent heat amount of 230 J/g or more. Therefore, latent heat cold storage material A-6 satisfies all the evaluation criteria, and is suitable for use in freezing preservation in a temperature range of −18° C. or lower.

Latent heat cold storage material A-7 contains 0.33 mmol of 1,3-diethylurea in an aqueous solution of 15 wt % of sodium chloride and 14 wt % of ammonium chloride, and has a melting starting point in a range of not less than −25.0° C. and not more than −19.0° C., an endothermic peak of not less than −25.0° C. and not more than −20.0° C., a solidification starting temperature of −32.0° C. or higher, and a latent heat amount of 230 J/g or more. Therefore, latent heat cold storage material A-7 satisfies all the evaluation criteria, and is suitable for use in freezing preservation in a temperature range of −18° C. or lower.

Examples 8 to 12 and Comparative Examples 7 to 14

Except that types and blending amounts of crystalline powders were changed as shown in Table 7, the same procedure as in Example 1 was carried out to prepare latent heat cold storage materials A-8 to A-12 and C-7 to C-14. For the obtained latent heat cold storage materials, characteristics were evaluated in the same manner as in Example 1. Results are shown in Tables 7-9. A saturated concentration of 1,3-dibutylurea at 25° C. to an aqueous solution containing only 15 wt % of sodium chloride and 10 wt % of ammonium chloride is less than 0.08 wt %, and the saturated concentration of 1,3-dicyclohexylurea is less than 7.0 wt %. Compounds as additives used in latent heat cold storage materials C-7 to C-14 have high solubility in the aqueous solution containing only sodium chloride and ammonium chloride, and added amounts of the compounds in latent heat cold storage materials C-7 to C-14 as shown in Table 7 are each smaller than the saturated concentration of the compounds to the aqueous solution containing only sodium chloride and ammonium chloride at 25° C.

TABLE 7

| Composition | Inorganic salts | | | Crystalline powder | | |
|---|---|---|---|---|---|---|
| | Water (g) | NaCl (g) | NH₄Cl (g) | Additive | (mmol) | (mg) |
| C-7 | 0.75 | 0.15 | 0.10 | N-methylurea | 0.33 | 25.0 |
| C-8 | | | | 1,1-dimethylurea | | 29.0 |
| C-9 | | | | 1,3-dimethylurea | | 29.0 |
| C-10 | | | | N-ethylurea | | 29.0 |
| C-11 | | | | Hydroxyurea | | 25.0 |
| C-12 | | | | Ethyl carbamate | | 30.0 |
| C-13 | | | | Acetamide | | 20.0 |
| C-14 | | | | Urea | | 20.0 |
| A-8 | | | | 1,3-dibutylurea | | 57.0 |
| A-9 | | | | 1,3-dibutylurea | 0.1 | 17.2 |
| A-10 | | | | 1,3-dibutylurea | 0.01 | 1.72 |
| A-11 | | | | 1,3-dibutylurea | 0.005 | 0.86 |
| A-12 | | | | 1,3-dicyclohexylurea | 0.33 | 75.0 |

TABLE 8

Results of differential scanning calorimetry

| Composition | Melting starting point (° C.) | Evaluation | Endothermic peak (° C.) | Evaluation |
|---|---|---|---|---|
| C-7 | −24.7 | ○ | −22.2 | ○ |
| C-8 | −23.7 | ○ | −21.6 | ○ |
| C-9 | −24.6 | ○ | −22.4 | ○ |
| C-10 | −29.0 | x | −22.5 | ○ |
| C-11 | −24.5 | ○ | −22.8 | ○ |
| C-12 | −23.6 | ○ | −21.9 | ○ |
| C-13 | −28.0 | x | −22.9 | ○ |
| C-14 | −26.5 | ○ | −23.1 | ○ |
| A-8 | −23.2 | ○ | −21.4 | ○ |
| A-9 | −22.9 | ○ | −21.2 | ○ |
| A-10 | −23.1 | ○ | −21.3 | ○ |
| A-11 | −23.1 | ○ | −21.5 | ○ |
| A-12 | −22.7 | ○ | −20.9 | ○ |

TABLE 9

Results of differential scanning calorimetry

| Composition | Solidification starting point (° C.) | Evaluation | Latent heat amount (J/g) | Evaluation | Total evaluation |
|---|---|---|---|---|---|
| C-7 | −42.0 | x | 226.1 | ○ | x |
| C-8 | −43.0 | x | 249.2 | ○ | x |
| C-9 | −41.0 | x | 217.7 | ○ | x |
| C-10 | −42.5 | x | 248.5 | ○ | x |
| C-11 | −41.0 | x | 249.4 | ○ | x |
| C-12 | −42.0 | x | 254.5 | ○ | x |
| C-13 | −43.0 | x | 228.6 | ○ | x |
| C-14 | −41.0 | x | 260.3 | ○ | x |
| A-8 | −28.5 | ○ | 259.2 | ○ | ○ |
| A-9 | −27.0 | ○ | 254.2 | ○ | ○ |
| A-10 | −26.0 | ○ | 262.0 | ○ | ○ |
| A-11 | −27.0 | ○ | 260.1 | ○ | ○ |
| A-12 | −28.0 | ○ | 224.2 | ○ | ○ |

Latent heat cold storage material C-7 contains 0.33 mmol of N-methylurea, and has a melting starting point of −24.7° C., an endothermic peak of −22.2° C. and a latent heat amount of 226.1 J/g, but has a low solidification starting point of −42.0° C., and thus has a large difference between the solidification starting temperature and the melting starting temperature.

Latent heat cold storage material C-8 contains 0.33 mmol of 1,1-dimethylurea, and has a melting starting point of −23.7° C., an endothermic peak of −21.6° C. and a latent heat amount of 249.2 J/g, but has a low solidification starting point of −43.0° C., and thus has a large difference between the solidification starting temperature and the melting starting temperature.

Latent heat cold storage material C-9 contains 0.33 mmol of 1,3-dimethylurea, and has a melting starting point of −24.6° C., an endothermic peak of −22.4° C. and a latent heat amount of 217.7 J/g, but has a low solidification starting point of −41.0° C., and thus has a large difference between the solidification starting temperature and the melting starting temperature.

Latent heat cold storage material C-10 contains 0.33 mmol of N-ethylurea, and has a melting starting point of −29.0° C., and thus does not satisfy evaluation criteria. Latent heat cold storage material C-10 has an endothermic peak of −22.5° C. and a latent heat amount of 248.5 J/g, but has a low solidification starting point of −42.5° C., and thus has a large difference between the solidification starting temperature and the melting starting temperature.

Latent heat cold storage material C-11 contains 0.33 mmol of hydroxyurea, and has a melting starting point of −24.5° C., an endothermic peak of −22.8° C. and a latent heat amount of 249.4 J/g, but has a low solidification starting point of −41.0° C., and thus has a large difference between the solidification starting temperature and the melting starting temperature.

Latent heat cold storage material C-12 contains 0.33 mmol of ethyl carbamate, and has a melting starting point of −23.6° C., an endothermic peak of −21.9° C. and a latent heat amount of 254.5 J/g, but has a low solidification starting point of −42.0° C., and thus has a large difference between the solidification starting temperature and the melting starting temperature.

Latent heat cold storage material C-13 contains 0.33 mmol of acetamide, and has a melting starting point of −28.0° C., an endothermic peak of −22.9° C. and a latent heat amount of 228.6 J/g, but has a low solidification starting point of −43.0° C., and thus has a large difference between the solidification starting temperature and the melting starting temperature.

Latent heat cold storage material C-14 contains 0.33 mmol of urea, and has a melting starting point of −26.5° C., an endothermic peak of −23.1° C. and a latent heat amount of 260.3 J/g, but has a low solidification starting point of −41.0° C., and thus has a large difference between the solidification starting temperature and the melting starting temperature.

Latent heat cold storage material A-8 contains 0.33 mmol of 1,3-dibutylurea, latent heat cold storage material A-9 contains 0.1 mmol of 1,3-dibutylurea, latent heat cold storage material A-10 contains 0.01 mmol of 1,3-dibutylurea, and latent heat cold storage material A-11 contains 0.005 mmol of 1,3-dibutylurea. Latent heat cold storage materials A-8 to A-11 have a melting starting point in a range of not less than −25.0° C. and not more than −19.0° C., an endothermic peak of not less than −25.0° C. and not more than −20.0° C., a solidification starting temperature of −32.0° C. or higher, and a latent heat amount of 230 J/g or more. Therefore, latent heat cold storage materials A-8 to A-11 satisfy all the evaluation criteria, and are suitable for use in freezing preservation in a temperature range of −18° C. or lower.

Latent heat cold storage material A-12 contains 0.33 mmol of 1,3-dicyclohexylurea, and has a melting starting point in a range of not less than −25.0° C. and not more than −19.0° C., an endothermic peak of not less than −25.0° C. and not more than −20.0° C., a solidification starting temperature of −32.0° C. or higher, and a latent heat amount of 220 J/g or more. Therefore, latent heat cold storage material A-12 satisfies all the evaluation criteria, and is suitable for use in freezing preservation in a temperature range of −18° C. or lower.

Next, evaluation criteria for the latent heat cold storage material with potassium chloride as a main agent in the present disclosure are shown below. The latent heat cold storage material is required to have an endothermic peak of −19° C. to −14° C. (both inclusive) when used for freezing preservation in a temperature range of −20° C. to −10° C. (both inclusive). The melting starting temperature is preferably −21° C. to −16° C. (both inclusive) in terms of the endothermic peak. Further, for reducing electric energy required for cold storage, and thus a cooling cost, the solidification starting temperature is required to be much higher than −40° C. as much as possible, and is preferably −25° C. or higher. Further, the latent heat amount is required to be 210 J/g or more from the viewpoint of practical utility. For measurement of the melting starting temperature, the endothermic peak, the solidification starting temperature and the latent heat amount, Input Compensation-type Double-Furnace DSC 8500 from PerkinElmer Japan Co., Ltd. was used.

<Evaluation Criteria of Solidification Starting Temperature>
◯: −25.0° C. or higher
x: lower than −25.0° C.
<Evaluation Criteria of Endothermic Peak>
◯: −19.0° C. to −14.0° C. (both inclusive)
x: lower than −19.0° C. or higher than −14.0° C.
<Evaluation Criteria of Melting Starting Temperature>
◯: −21.0° C. to −16.0° C. (both inclusive)
x: lower than −21.0° C. or higher than −16.0° C.
<Evaluation Criteria of Latent Heat Amount>
◯: 210 J/g or more
x: less than 210 J/g The above evaluation results were totally evaluated, and samples which were suitable as a cold storage material for freezing as a difference between the solidification starting temperature and the melting starting temperature was 7° C. or less were rated "◯" while samples which were not suitable as a cold storage material for freezing were rated "x" in total evaluation.

Examples 13 and 14 and Comparative Examples 15 and 16

To an aqueous solution of 10 wt % of potassium chloride and 10 wt % of ammonium chloride was added 1,3-diethylurea as a crystalline powder in an amount as shown in Table 10, and the mixture was stirred and homogeneously mixed to prepare a latent heat cold storage material. For obtained latent heat cold storage materials B-1 and B-2 and C-15 and C-16, characteristics were evaluated in the same manner as in Example 1. Results are shown in Tables 10-12. The saturating concentration of 1,3-diethylurea at 25 degrees Celsius with regard to an aqueous solution containing 10 wt % of potassium chloride and 10 wt % of ammonium chloride is 7.0 wt %. Please note that the saturating concentration of 1,3-diethylurea at 25 degrees Celsius with regard to an aqueous solution containing 12.5 wt % of potassium chloride and 12.5 wt % of ammonium chloride (i.e., an aqueous solution having inorganic salt concentration of 25 wt %) is less than 7.0 wt %.

TABLE 10

| Composition | Inorganic salts | | | Crystalline powder 1,3-diethylurea | |
|---|---|---|---|---|---|
| | Water (g) | KCl (g) | NH$_4$Cl (g) | (mmol) | (mg) |
| C-15 | 0.80 | 0.10 | 0.10 | 0 | 0 |
| C-16 | | | | 0.56 | 64.5 |
| B-1 | | | | 0.78 | 90.4 |
| B-2 | | | | 0.89 | 103.3 |

TABLE 11

Results of differential scanning calorimetry

| Composition | Melting starting point (° C.) | Evaluation | Endothermic peak (° C.) | Evaluation | Total evaluation |
|---|---|---|---|---|---|
| C-15 | −16.2 | ◯ | −14.4 | ◯ | x |
| C-16 | −17.3 | ◯ | −15.6 | ◯ | x |
| B-1 | −17.2 | ◯ | −15.2 | ◯ | ◯ |
| B-2 | −17.5 | ◯ | −15.2 | ◯ | ◯ |

TABLE 12

Results of differential scanning calorimetry

| Composition | Solidification starting point (° C.) | Evaluation | Latent heat amount (J/g) | Evaluation | Total evaluation |
|---|---|---|---|---|---|
| C-15 | −30.0 | x | 307.8 | ◯ | x |
| C-16 | −28.0 | x | 281.5 | ◯ | x |
| B-1 | −24.0 | ◯ | 276.2 | ◯ | ◯ |
| B-2 | −24.5 | ◯ | 277.6 | ◯ | ◯ |

Latent heat cold storage material C-15 is an aqueous solution containing 10 wt % of potassium chloride and 10 wt % of ammonium chloride as a conventional cold storage material composition (D1 in FIG. 4 in International Patent Publication No. WO 2014/091938), and does not contain a crystalline powder. Latent heat cold storage material C-15 has a melting starting point of −16.2° C., an endothermic peak of −14.4° C., and a high latent heat amount of 307.8 J/g, but has a low solidification starting point of −30.0° C., and thus a large difference between the solidification starting temperature and the melting starting temperature. Latent heat cold storage material C-16 contains 0.56 mmol of 1,3-diethylurea, and has a melting starting point of −17.3° C., an endothermic peak of −15.6° C. and a latent heat amount of 281.5 J/g, but has a low solidification starting point of −28.0° C., and thus has a large difference between the solidification starting temperature and the melting starting temperature.

Latent heat cold storage material B-1 contains 0.78 mmol of 1,3-diethylurea, and latent heat cold storage material B-2 contains 0.89 mmol of 1,3-diethylurea. Latent heat cold storage materials B-1 and B-2 have a melting starting point in a range of not less than −21.0° C. and not more than −16.0° C., an endothermic peak of not less than −19.0° C. and not more than −14.0° C., a solidification starting temperature of −25.0° C. or higher, and a latent heat amount of 230 J/g or more. Therefore, latent heat cold storage materials B-1 and B-2 satisfy all the evaluation criteria, and are suitable for use in freezing preservation in a temperature range of not less than −20° C. and not more than −10° C.

The latent heat cold storage material according to the present disclosure can be widely used as a latent heat cold storage material capable of storing, as latent heat, cold heat required for freezing in transportation and storage of fresh products, and extracting the cold heat at a certain temperature of −10° C. or lower. The cold storage material is filled into a cold storage vessel, and frozen in a freezer before being used.

REFERENCE SIGNS LIST

101 temperature-fall curve in differential scanning calorimetry
102 temperature-rise curve in differential scanning calorimetry
103 solidification starting point
104 melting starting point
105 endothermic peak
201 temperature-fall curve in differential scanning calorimetry
202 temperature-rise curve in differential scanning calorimetry
203 solidification starting point
204 melting starting point
205 endothermic peak

What is claimed is:

1. A latent heat cold storage material comprising:
water;
a crystalline powder; and
at least one inorganic salt,
wherein the crystalline powder is 1,3-diethylurea,
the 1,3-diethylurea has a concentration of not less than 0.1 wt % and not more than 20 wt %, and
the latent heat cold storage material has a solidification starting point of not less than −30° C. and not more than −10° C.

2. The latent heat cold storage material according to claim 1, wherein the inorganic salt includes sodium chloride.

3. The latent heat cold storage material according to claim 1, wherein the inorganic salt includes potassium chloride.

4. The latent heat cold storage material according to claim 1, wherein the inorganic salt includes sodium chloride and ammonium chloride.

5. The latent heat cold storage material according to claim 1, wherein the inorganic salt includes potassium chloride and ammonium chloride.

6. A latent heat cold storage material comprising:
water;
a crystalline powder; and
at least one inorganic salt,
wherein the crystalline powder is 1,3-dibutylurea, and
the latent heat cold storage material has a solidification starting point of not less than −30° C. and not more than −10° C.

7. The latent heat cold storage material according to claim 6, wherein the inorganic salt includes sodium chloride.

8. The latent heat cold storage material according to claim 6, wherein the inorganic salt includes potassium chloride.

9. The latent heat cold storage material according to claim 6, wherein the inorganic salt includes sodium chloride and ammonium chloride.

10. The latent heat cold storage material according to claim 6, wherein the inorganic salt includes potassium chloride and ammonium chloride.

11. A latent heat cold storage material comprising:
water;
a crystalline powder; and
at least one inorganic salt,
wherein the crystalline powder is 1,3-dicyclohexylurea, and
the latent heat cold storage material has a solidification starting point of not less than −30° C. and not more than −10° C.

12. The latent heat cold storage material according to claim 11, wherein the inorganic salt includes sodium chloride.

13. The latent heat cold storage material according to claim 11, wherein the inorganic salt includes potassium chloride.

14. The latent heat cold storage material according to claim 11, wherein the inorganic salt includes sodium chloride and ammonium chloride.

15. The latent heat cold storage material according to claim 11, wherein the inorganic salt includes potassium chloride and ammonium chloride.

* * * * *